3,015,676
METHOD FOR ORTHO ARALKYLATION OF PHENOL
David A. Johnson, Syracuse, and Elwin J. Richardson, Jr., Kirkville, N.Y., assignors, by mesne assignments, to Bristol-Myers Company, New York, N.Y., a corporation of Delaware
No Drawing. Filed Feb. 4, 1959, Ser. No. 791,039
2 Claims. (Cl. 260—619)

This invention relates to an improved method for the preparation of ortho aralkyl substituted phenolic compounds. More particularly, the invention comprises a simple one-step method whereby one may obtain a product containing a preponderance of the ortho isomer from the substitution, in the presence of a Lewis acid, of an aromatic nucleus containing an ortho-para directing substituent.

One of the greatest difficulties of preparative organic chemistry is that which is encountered when one attempts to prepare an isomer specific product by means of a substitution reaction on a benzene nucleus containing an ortho-para directing substituent. The product, thus obtained, will, in all probability, consist of an approximately equal mixture of the ortho and para isomers. Thus, to obtain a product containing predominately one isomer, it then becomes necessary to carry out a separate purification operation, which is usually a laborious and difficult undertaking.

Claisen (Ann. 442, 210 (1925) and Z. Angrew, Chem. 36, 478 (1923) has attempted to solve this difficulty by the aralkylation of a suspension of sodium phenolate in a medium such as benzene or toluene. However, he found that, in addition to a minimization of the para isomer yield, he obtained unfavorably low yields of the ortho isomer.

Of the disclosed methods for the benzylation of phenol, the method of McMaster and Bruner (Ind. Eng. Chem. 28, 505 (1936) has been considered to be the most desirable for large scale operations. Their method consists of the slow addition of benzyl chloride to a large excess of molten phenol. The use of a large excess of phenol is bifunctional; one function being as a suitable solvent and the other as a means of shifting the equilibrium toward the formation of the substituted product. The optimum conditions found by McMaster and Bruner were a reaction temperature of 150° C.; the use of a 10:1 molar excess of phenol; an addition time of four (4) hours for the benzyl chloride; and a final heating of the reaction mixture for one (1) hour. The reaction mixture had an ortho-para ratio of 1.3:1, as evidenced by a 52.7% over-all yield (yield based on initial weight of benzyl chloride) of the ortho isomer and a 39.9% over-all yield of the para isomer, obtained by fractional distillation, under reduced pressure, of the reaction mixture.

For some purposes; such as, for example, in the manufacture of pharmaceuticals, dyestuff and dyestuff intermediates, it is most desirable to have one of the aralkylated phenol isomers in a relatively pure state. There are two common methods available to effect such a purification. One method involves fractional distillation of the isomeric mixture. Another method is the procedure of Akinoff, which is disclosed in U.S. Patent No. 2,016,848. His method consists of dissolving the isomeric mixture in a suitable solvent, such as toluene, and then forming the sodium phenolate by the addition of aqueous sodium hydroxide. After removal of the water by distillation, the insoluble sodium para aralkylphenolate is removed by filtration. Recovery of the ortho isomer is accomplished by aqueous extraction of the toluene solution, followed by acidification of the aqueous extract. As a result of this acidification, the crude ortho isomer separates in the form of an oily layer. The oily layer contains predominately the ortho isomer, although it is still contaminated with some of the para isomer.

Therefore, until the time of our invention, in order to obtain a relative isomeric pure ortho aralkylphenol, it has been necessary to use a two-step procedure, first forming the isomeric mixture and then effecting an isomeric purification. We have discovered that a simple one-step method for the preparation of relative isomerically pure ortho aralkylphenol can be effected.

Our method consists of the gradual addition of the aralkyl halide to a solution of a moderate excess of the phenolic compound in an inert liquid hydrocarbon nonpolar solvent. An elevated temperature is necessary to effect solubility and is also advantageous as it increases the speed of the reaction and hastens the removal of the hydrogen halide. The reaction temperature is therefore desirably maintained within the range of 130° to 180° C. and preferably from within the range of 150° to 160° C. What catalytic effect might be necessary is provided by the in situ generation of the hydrogen halide, which is a Lewis-type acid. The product resulting from our method of aralkylation has given an ortho-para ratio in the range of 20:1 or greater, this corresponds to an increase of approximately nineteen hundred percent (1900%) in favor of the ortho form (compared with the method of McMaster and Bruner), while still maintaining a good (60% or better) over-all yield of the desired product.

We have found that a suitable aralkylating agent may be either a chloride or bromide of benzyl alcohol, or of parachlorobenzyl alcohol or of other substituted benzyl alcohols. The aromatic ring of the aralkylating agent may be substituted with such groups as alkoxy, halogen or alkyl. Phenolic compounds or phenols suitable to our method include phenol and phenols having meta substituents, such as alkyl, alkoxy or halogen. We have determined that the use of a moderate excess of the phenolic compound (in the range of a 2 to 8 mole excess, preferably a 5 mole excess) gives the best results, the unreacted phenol and solvent may, of course, be recycled for further use.

The preferred solvents for our method include the normal and branched chain aliphatic hydrocarbons containing from seven to sixteen carbon atoms or mixtures thereof. These mixtures of hydrocarbons should preferably contain predominately saturated hydrocarbon, however, the presence of some unsaturated hydrocarbons has no detrimental effect. We prefer to use as a nonpolar solvent a mixture of various aliphatic hydrocarbons, which ideally has a boiling point ten to fifteen degrees above the reaction temperature. This property is desirable as it facilitates its easy removal after completion of the reaction. Although more expensive, one could employ a pure aliphatic hydrocarbon solvent. We have found that Shell 360 Solvent is a convenient solvent for our use. It is a narrow range, low end point, Mineral Spirits fraction from which the aromatic hydrocarbons have been removed. Some of its typical properties are a boiling range of 160° C. to 185° C., gravity of 51.2° API, density 6.448 (pounds per gallon), an aniline point of 147° F. and a Kauri butanol number of 34.

So that those skilled in the art may have a clear understanding of our invention and for illustrative purposes as to the best mode of carrying out our process, the following examples are offered. These examples are offered for illustrative purposes only, and not to limit our invention.

*Example 1*

Benzyl chloride (63.3 g., 0.5 moles) is allowed to drop slowly, over a period of 3.75 hours, into a vigorously stirred solution of phenol (235 g., 2.5 moles) and 250 ml. of an aliphatic hydrocarbon solvent (Shell 360 Solvent) at a temperature of 150° C. By means of suitable apparatus the evolved hydrogen chloride is absorbed in a water trap. After completion of addition of the benzyl chloride, the reaction mixture is maintained at 150° C. for an additional 2.75 hour period. During this period of heating, the removal of hydrogen chloride is completed. Separation of the reaction mixture into three fractions is accomplished by fractional distillation under reduced pressure. The first fraction, which is composed of the excess phenol and the solvent, may be recycled. The residue remaining from the distillation (third fraction) weighed 10.5 g. The second fraction, which consists of predominately the ortho isomer of benzylphenol, weighed 81.5 g. (0.44 moles, 88% over-all yield).

For purposes of determining the ortho-para ratio, the second fraction, which is the benzylated product, was separated, by means of the sodium salt method, which is described above, into its two isomeric forms. This separation yielded 2.5 g. (0.0135 moles, 2.7% over-all yield) of the pure para isomer and 58 g. (0.315 moles, 63% over-all yield) of the pure ortho isomer. This corresponds to an ortho-para ratio of greater than 20:1. In actual practice, since there is only approximately five percent (5%) of the para isomer present in the original product (second fraction), purification of the material would not usually be necessary.

*Example 2*

The use of parachlorobenzyl chloride as the aralkylating agent in the process of Example 1 results in formation of substantially pure ortho (parachlorobenzyl) phenol.

*Example 3*

The process of Example 1 proceeds in the same manner in the presence of hydrogen bromide as in the presence of hydrogen chloride. Thus, when the process of Example 1 is carried out using as the aralkylating agent, benzyl bromide instead of benzyl chloride, a good yield of ortho benzylphenol is obtained.

*Example 4*

The process of Example 1 is modified by the use of decane as the solvent and a reaction temperature of 160° C. The product obtained is essentially pure ortho benzylphenol.

Thus, this method for isomer specific ortho-aralkylation of a phenolic compound produces a good yield of the desired isomer, essentially free of the undesired isomer, without sacrificing the over-all yield.

While in the foregoing specification various embodiments of this invention have been set forth and specific details thereof elaborated for the purpose of illustration, it will be apparent to those skilled in the art that this invention is susceptible to other embodiments and that many of these details may be varied widely without departing from the basic concept and spirit of the invention.

We claim:
1. The method of benzylation of phenol in the presence of hydrogen chloride resulting in the formation of a product having a high ortho-para ratio, which method comprises the gradual addition of benzyl chloride to a solution of a moderate excess of phenol in a non-polar solvent selected from the group consisting of straight and branched chain aliphatic hydrocarbons having from 7 to 16 carbon atoms inclusive and mixtures thereof at a temperature range of 130° to 180° C.
2. The method of benzylation of phenol in the presence of hydrogen bromide resulting in the formation of a product having a high ortho-para ratio, which method comprises the gradual addition of benzyl bromide to a solution of a moderate excess of phenol in a nonpolar solvent selected from the group consisting of straight and branched chain aliphatic hydrocarbons having from 7 to 16 carbon atoms inclusive and mixtures thereof at a temperature range of 130° to 180° C.

References Cited in the file of this patent
UNITED STATES PATENTS 2,330,722     Lieber _____ Sept. 28, 1943

OTHER REFERENCES

McMaster et al.: Ind. and Eng. Chem., vol 28 (1936), pages 505, 506 (2 pages).